United States Patent [19]

Amano et al.

[11] Patent Number: 4,822,266

[45] Date of Patent: Apr. 18, 1989

[54] SLIDE FALLING PREVENTION DEVICE IN A TIRE VULCANIZER

[75] Inventors: Itaru Amano, Kobe; Yasuhiko Fujieda, Akashi; Kashiro Ureshino, Kobe, all of Japan

[73] Assignee: Kabushiki Kaisha Kobe Seiko Sho, Kobe, Japan

[21] Appl. No.: 177,950

[22] Filed: Apr. 5, 1988

[30] Foreign Application Priority Data

Apr. 15, 1987 [JP] Japan .............................. 62-58111[U]

[51] Int. Cl.⁴ ...................... B29C 33/20; B29C 35/00
[52] U.S. Cl. .................................... 425/34.1; 72/436; 100/53; 425/151; 425/406
[58] Field of Search ..................... 425/28.1, 34.1, 151, 425/406, 581, 588; 100/53, 219; 72/436

[56] References Cited

U.S. PATENT DOCUMENTS

| | | | |
|---|---|---|---|
| 1,905,463 | 4/1933 | Grange | 425/151 |
| 2,346,519 | 4/1944 | Tornberg | 425/151 |
| 2,482,072 | 9/1949 | Soderquist | 425/151 |
| 3,240,653 | 3/1966 | Mattox et al. | 425/151 |

*Primary Examiner*—Willard Hoag
*Attorney, Agent, or Firm*—Oblon, Fisher, Spivak, McClelland & Maier

[57] ABSTRACT

A slide falling prevention device in a tire vulcanizer including a vulcanizer frame, a fixed lower die fixedly located on the vulcanizer frame, a slide adapted to be lifted and lowered along the frame, a movable upper die retained to the slide and adapted to be vertically opened and closed relative to the lower die, a vertically moving member provided at a central position of the slide for opening and closing the upper die, a hollow pressure member provided at the central position of the slide for applying pressure to the upper die, said hollow pressure member being located diametrically outside the vertically moving member in such a manner as to be concentrical to and separate from the vertically moving member, a pressure device mounted to the vulcanizer frame in such a manner as to surround the hollow pressure member, an upper die height adjusting mechanism for connecting the slide with the hollow pressure member; and a movable pressure member provided in the pressure device and a locking member disengageably mounted to the movable pressure member in such a manner as to surround the hollow pressure member, wherein when the hollow pressure member is lifted to open the upper die, the locking member is engaged with a lower end of the hollow pressure member, while when the hollow pressure member is lowered to close the upper die, the locking member is engaged with an intermediate position of the hollow pressure member.

3 Claims, 6 Drawing Sheets

SLIDE FALLING PREVENTION DEVICE IN A TIRE VULCANIZER

BACKGROUND OF THE INVENTION

1. Field of the Invention

The present invention relates to an improvement in a device for preventing a slide retaining a movable upper die in a tire vulcanizer, particularly of a type such that the movable upper die is vertically moved to be opened and closed relative to a fixed lower die.

2. Discussion of the Background

Generally in a tire vulcanizer, a fixed lower die is fixed on a base of a vulcanizer frame, and a green tire is set on the fixed lower die. Then, a movable upper die is closed and clamped relative to the fixed lower die, and a heating medium such as steam is supplied under pressure to carry out vulcanization and obtain a tire shape corresponding to the shape of the die. A die opening/closing system for opening and closing the movable upper die relative to the fixed lower die is generally classified as a rotary opening/closing system (tilt-back type) including a crank gear, a side link rotatably interlocking with the crank gear and a top link connected to the side link and retaining the movable upper die and a vertical opening/closing system (slide type) wherein the movable upper die is vertically moved along the vulcanizer frame. Such a vertical opening/closing type press is disclosed in Japanese Utility Model Laid-Open Publication No. 58-153025 by the applicant, Japanese Patent Laid-Open Publication Nos. 59-12827 and 61-134210, for example.

In the tire vulcanizer, it is necessary to set the green tire into the lower die under the condition where the movable upper die is opened, and take out the tire after vulcanization from the lower die. During such operation, there is a danger of the upper die dropping or falling from its open position due to a problem occurring or misoperation thereof, and it is therefore necessary to provide a perfect safety measure for preventing such from occurring. From the viewpoint of the above, the rotary opening/closing system as mentioned above is relatively safe since the side link itself is rotated so as to be tilted and retracted upward aside the vulcanizer frame. To the contrary, the vertical opening/closing system has a danger of the upper die falling since the upper die is mounted to a slide vertically movably guided by slide guides provided on the sides of the vulcanizer frame, and the upper die in its open position is located at a upper position on the frame. FIG. 6 shows a conventional falling prevention means for preventing the danger of the upper die falling. Although there have been proposed various mechanisms in the prior art vertical opening/closing type vulcanizer, the mechanism shown in FIG. 6 is an example as disclosed in Japanese Utility Model Laid-Open Publication No. 58-153025 by the applicant. As the details of the mechanism are described in the specification of this prior art, there will be described hereinbelow a falling prevention means for the movable upper die in principal. A vulcanizer frame 1 is constructed of a base frame 1a, side frames 1b and a top platen 1c. A fixed lower die 2 is mounted on the base frame 1a, and a slide 4 is vertically movably guided on slide guides 3 provided on the side frames 1b. A movable upper die 5 is mounted to the slide 4, and a height adjusting mechanism 6 for adjusting the height of the movable upper die 5 is mounted at the center of the upper portion of the slide 4. The height adjusting mechanism 6 includes a rotatable adjusting screw 6a threadedly engaged with a tapped hole 7b formed at a lower end of a hollow pressure member 7 for applying pressure to the movable upper die. The hollow pressure member 7 is in the form of a hollow post, and is formed at its one side with an axially extending slit 7a. Thus, the hollow pressure member 7 is connected with the slide 4. A bracket 8 is fixed on the top platen 1c at a position corresponding to the slit 7a, and a vertically moving member 9 for opening and closing the upper die is mounted to the bracket 8 in concentrical relationship with the hollow pressure member 7. The vertically moving member 9 is constituted of a hydraulic cylinder 9a and a piston rod 8b. The piston rod 8b is connected through a connecting portion 10 to the hollow pressure member 7. Thus, the hollow pressure member 7 is allowed to vertically pass through the top platen 1c, and the movable upper die 5 is adapted to be vertically moved through the height adjusting mechanism 6 and the slide 4, thereby making the movable upper die open and close relative to the fixed lower die. Further, a pressure device 11 is so mounted to the top platen 1c as to surround the hollow pressure member 7. The pressure device 11 is constituted of a hydraulic cylinder 11a and a piston rod 11b. The hydraulic cylinder 11a is fixed to the platen 1c. A stopper mechanism 12 is associated with the piston rod 11b adapted to be moved by supplying pressure into the hydraulic cylinder 11a, and the stopper mechanism 12 is made engageable with the hollow pressure member 7. After the movable upper die 5 is closed relative to the fixed lower die 2, the piston rod 11b is integrally connected through the stopper mechanism 12 to the hollow pressure member 7, and then pressure is supplied to the cylinder 11a to carry out clamping of both the dies. In the vertical opening/closing type tire vulcanizer shown in FIG. 6, the movable upper die 5 is opened by lifting the piston rod 8b of the vertically moving member 9, thereby lifting the slide 4 through the hollow pressure member 7 and the height adjusting mechanism 6 into an upper limit position as shown by a chain line on the left side in FIG. 6. To prevent undue falling of the upper die 5 in the upper limit position, there is provided a falling prevention mechanism 13 on the side frame 1b at a position corresponding to the upper limit position of the slide. The falling prevention mechanism 13 is constituted of a hydraulic cylinder 13a and a piston rod 13b provided with a return spring 14. The piston rod 13b has a forward end serving as a supporting portion 13c adapted to support the bottom of the slide 4 lifted. Thus, undue falling of the movable upper die is prevented. FIG. 6 shows a twin type vulcanizer such that two sets of upper and lower dies 5 and 2 are installed in the same vulcanizer frame 1. In such a twin type vulcanizer, another falling prevention mechanism (not shown) similar to the mechanism mentioned above is provided at position A of the right side frame 1b corresponding to the location on the left side frame 1b. Reference numeral 15 designates a known central mechanism provided on the base frame 1a at the central position of the fixed lower die 2 for supplying and discharging a heating medium (steam or the like) and opening an elastic forming member formed of an elastically deformable material such as a rubber bag and adapted to contact the inner surface of the green tire set on the fixed lower die 2. Generally in such a vertical opening/closing type tire vulcanizer as mentioned above, as the movable upper die is vertically moved along the frame, the accuracy of such movement is improved as compared with the rotary opening/closing type vulcanizer, and the opening/closing mechanism is made compact. However, as the upper die 5 in its open position is located just over the lower die 2 in the frame, there is a possibility of a serious mechanical damage and a dangerous human accident occurring because of possible misoperation or pressure escape in the vertically moving member 9. Therefore, utilization of the falling prevention means is essential. Further, the falling prevention mechanism 13 as shown FIG. 6 is generally located in a sufficient space between the side frame 1b and the slide 4, and it is often used in the case where the vertical opening/closing mechanism and the clamping mechanism are different from the above-mentioned mechanism.

However, the above-mentioned slide falling prevention means has the following problem. That is, the falling prevention mechanism 13 is an essential safety mechanism in the vertical opening/closing type vulcanizer, and it is necessary to locate a pair of the falling prevention mechanisms 13 on both side frames 1b since the slide guides 3 are provided on a center frame 1d between both the side frames 1b in the twin type vulcanizer as shown in FIG. 6. Similarly in a single type vulcanizer, two falling prevention mechanisms 13 are necessary. The reason for this is that if the slide 4 were supported by a single mechanism 13, the pressure from the vertically moving member 9 would be applied to the slide guide 3 on the side frame 1b having no falling prevention mechanism, causing a damage of the guide 3. Therefore, it is always necessary to provide a plurality of falling prevention mechanisms 13 at positions equally spaced from each other and at the same exact height. This causes an increase in cost and accuracy in the installation of the mechanisms. Further, the structure of the machine is complicated so as to thus hinder the object of making the machine compact and simple.

SUMMARY OF THE INVENTION

Accordingly, it is an object of the present invention to provide a slide falling prevention device for a vertical opening/closing type tire vulcanizer which may be located at the central position of the vulcanizer collectively with the vertically moving member for opening and closing the die, the hollow pressure member and the pressure device for applying pressure to the die.

It is another object of the present invention to provide a slide falling prevention device for a vertical opening/closing type tire vulcanizer which may also serve as a pressure transmitting mechanism between the hollow pressure member and the pressure device.

It is a further object of the present invention to provide a slide falling prevention device for a vertical opening/closing type tire vulcanizer which may be made simple and compact.

According to the present invention, there is provided a slide falling prevention device in a tire vulcanizer including a vulcanizer frame, a fixed lower die fixedly located on the vulcanizer frame, a slide adapted to be lifted and lowered along the frame, a movable upper die retained to the slide and adapted to be vertically opened and closed relative to the lower die, a vertically moving member provided at a central position of the slide for opening and closing the upper die, a hollow pressure member provided at the central position of the slide for applying pressure to the upper die, said hollow pressure member being located diametrically outside the vertically moving member in such a manner as to be concentric to and separate from the vertically moving member, a pressure device mounted to the vulcanizer frame in such a manner as to surround the hollow pressure member, and an upper die height adjusting mechanism for connecting the slide with the hollow pressure member; the improvement comprising a movable pressure member provided in the pressure device and a locking member disengageably mounted to the movable pressure member in such a manner as to surround the hollow pressure member, wherein when the hollow pressure member is lifted to open the upper die, the locking member is engaged with a lower end of the hollow pressure member, while when the hollow pressure member is lowered to close the upper die, the locking member is engaged with an intermediate position of the hollow pressure member.

The above-mentioned construction of the present invention is exemplarily shown in FIGS. 1 and 2, wherein a fixed lower die 2 is provided on a base frame 1a of a vulcanizer frame 1, and a slide 4 is vertically movably retained on slide guides 3 mounted on side frames 1b (including a center frame 1d). A movable upper die 5 is mounted to the slide 4, and a height adjusting mechanism 6 for adjusting the height of the upper die 5 is located at a central position of the slide 4. The height adjusting mechanism 6 is provided with an adjusting screw shaft 6a threadedly engaged with a tapped hole 7b formed at a lower end of a hollow pressure member 7 like a hollow post. The hollow pressure member 7 is vertically movably inserted through a top platen 1c, and is formed at its circumference with a slit 7a. A bracket 8 is provided on the top platen 1c at a position corresponding to the slit 7a. A vertically moving member 9 for opening and closing the upper die is mounted to the bracket 8 concentrically with the hollow pressure member 7, which vertically moving member 9 is comprised of a hydraulic cylinder 9a and a piston rod 9b. The piston rod 9b is connected to a connecting member 10 provided inside the lower end portion of the hollow pressure member 7. A pressure device 11 for clamping the upper die is so provided as to surround the hollow pressure member 7, which pressure device 11 is comprised of a hydraulic cylinder 11a and a piston rod 11b. The hydraulic cylinder 11a is fixed to the top platen 1c. A pair of locking members 17 are movably retained to a lower end of the piston rod 11b serving as a movable pressure member in the pressure device 11 in such a manner as to be advanced to and retracted from the hollow pressure member 7. When the piston rod 9b of the vertically moving member 9 is advanced as shown in FIG. 1 to thereby lower the slide 4 through the hollow pressure member 7 and the upper die height adjusting mechanism 6 down to a die closing position, the locking members 17 are engaged with an engaging portion 16 formed at an intermediate position of the hollow pressure member 7. On the other hand, when the piston rod 9b of the vertically moving member 9 is retracted as shown in FIG. 2 to thereby lift the slide 4 through the hollow pressure member 7 and the upper die height adjusting mechanism 6 up to a die opening position, the locking members 17 support the lower end of the hollow pressure member 7 in the lift position. In operation, the locking members 17 provided at the lower end of the piston rod 11b of the pressure device 11 are normally retracted to assume a position not interfering with the vertical movement of the hollow pressure member 7. Then, the slide 4 is lowered to the die closing position by the vertically moving member 9 to thereby close the upper movable die 5 relative to the fixed lower die 2, and both the dies 5 and 2 are required to be clamped by the pressure device 11. At this time, the locking members 17 are advanced so as to be engaged with the engaging portion 16 formed on the corresponding circumferential position of the hollow pressure member 7, thereby uniting the hollow pressure member 7 with the piston rod 11b of the pressure device 11 retaining the locking members 17. Accordingly, when a pressure fluid is supplied to cylinder 11a, the pressure is transmitted through the piston rod 11b, the locking members 17 and the engaging portion 16 to the hollow pressure member 7, and simultaneously the pressure is transmitted through the slide 4 to the movable upper die 5, thus clamping both the dies 5 and 2 under pressure. On the other hand, when the slide 4 is lifted to the die opening position as shown in FIG. 2, the locking members 17 in the retracted position are advanced so as to be forced into the lower end of the hollow pressure member 7 in the lift position to thereby support the hollow pressure member 7. Accordingly, even when there occurs misoperation or pressure escape in the vertically moving member 9, it is possible to reliably prevent the movable upper die 5 and the slide 4 from falling by the locking members 17, thus attaining the object of the present invention.

Other objects and features of the invention will be more fully understood from the following detailed description and appended claims when taken with the accompanying drawings.

DESCRIPTION OF THE PREFERRED EMBODIMENT

There will now be described a preferred embodiment of the present invention with reference to FIGS. 1 to 5.

Figure 1:
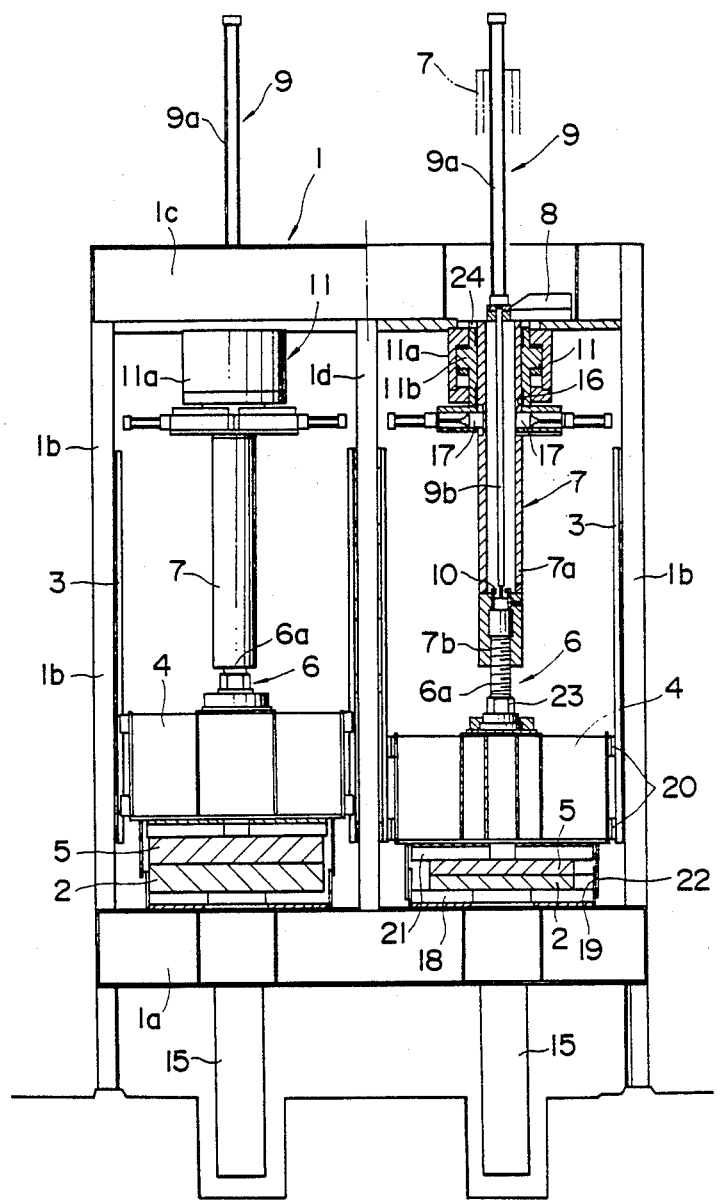
FIG. 1 is an elevational view in section of a preferred embodiment of the tire vulcanizer according to the present invention under the die closing condition.
Figure 2:
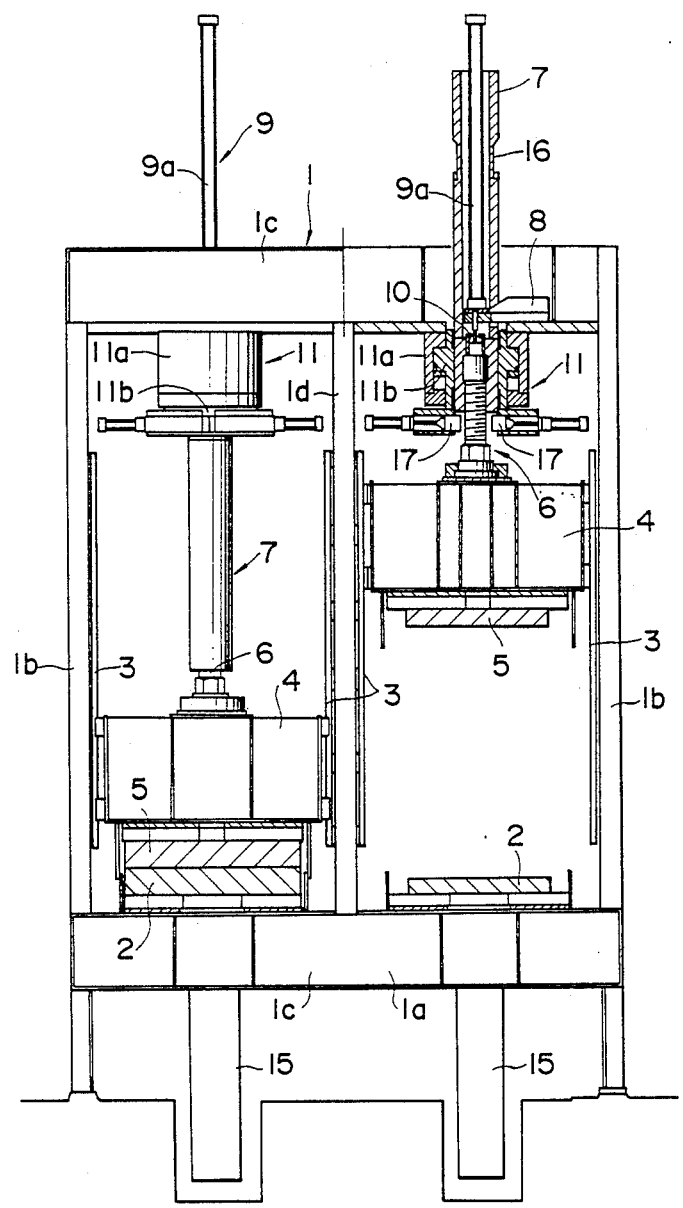
FIG. 2 is an elevational view in section similar to FIG. 1, showing the die opening condition.
Figure 3:
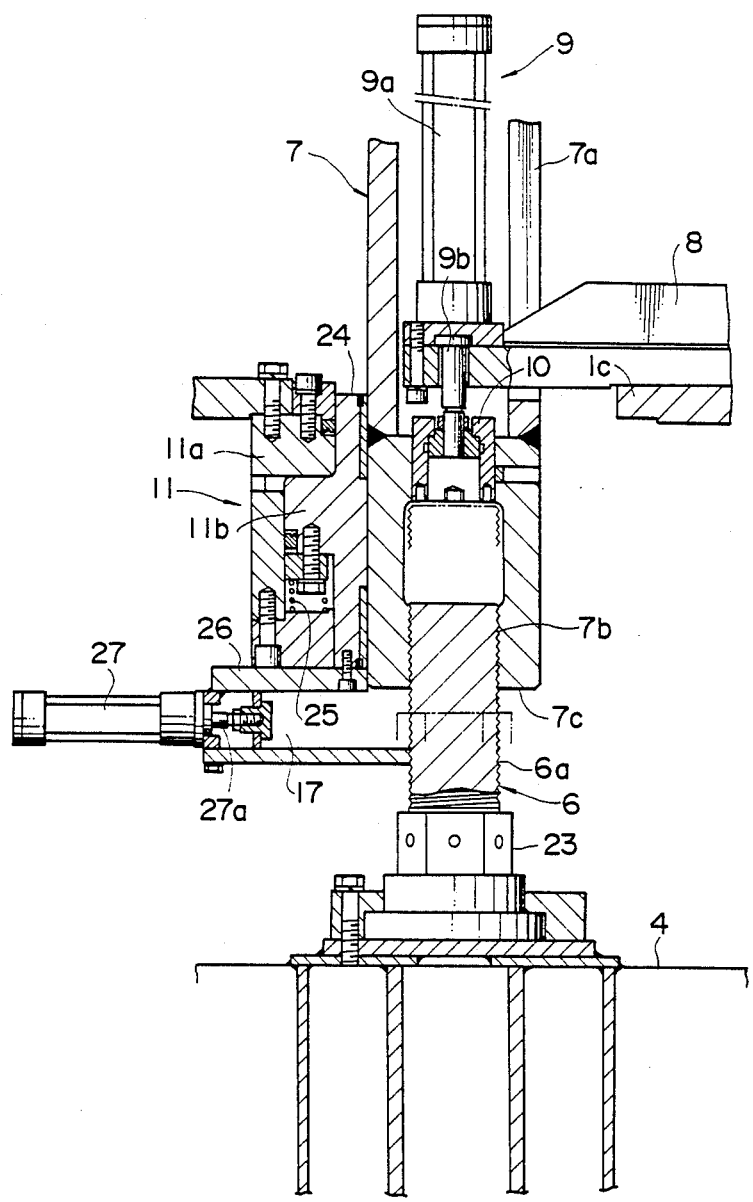
FIG. 3 is an elevational view in section of an essential part of the preferred embodiment, showing a locking condition in the die opening position.
Figure 4:
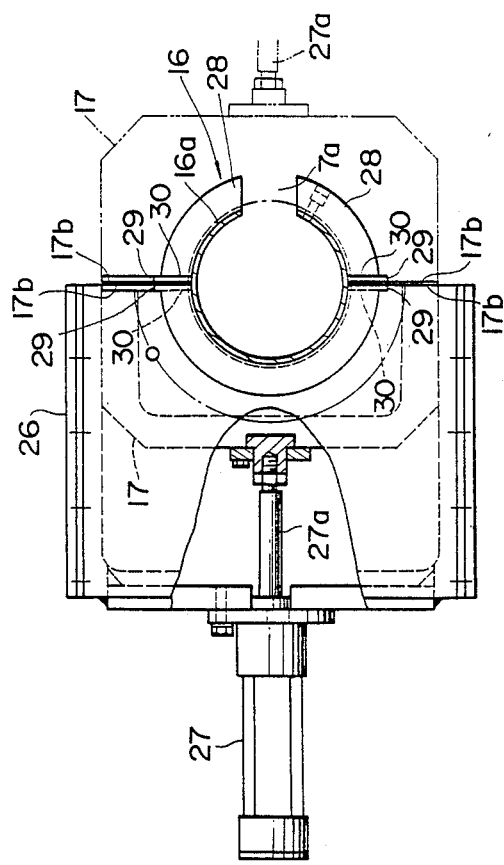
FIG. 4 is a partially broken away plan view of an essential part of the locking members shown in FIG. 3.
Figure 5:
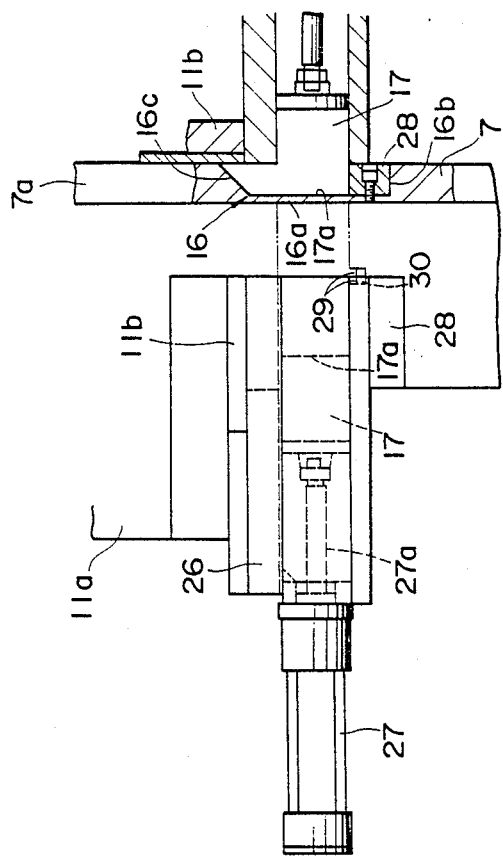
FIG. 5 is a sectional side view of FIG. 4.
Figure 6:
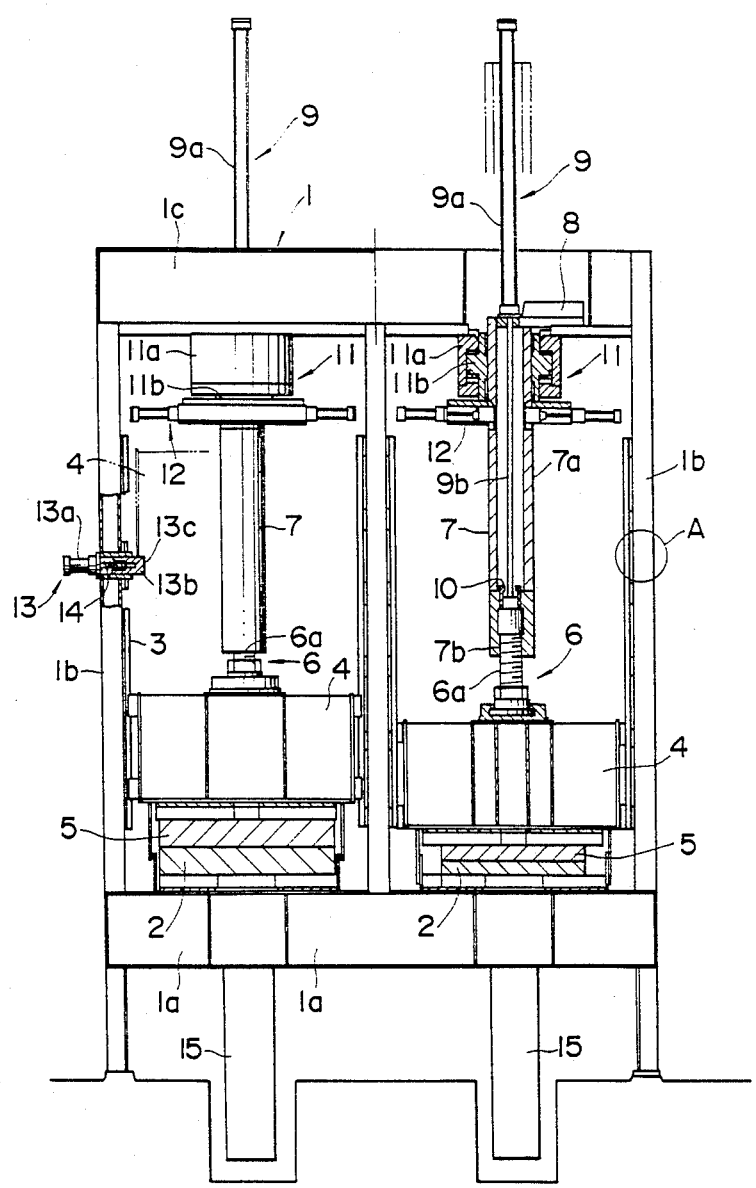
FIG. 6 is an elevational view in section of the tire vulcanizer employing the conventional slide falling prevention device.

Although the preferred embodiment of the tire vulcanizer shown in FIGS. 1 and 2 is of a twin type having two sets of vulcanizing dies, the present invention is naturally applicable to a single type vulcanizer, and a basic structure of the vulcanizer itself is similar to that of the conventional vertically opening/closing type tire vulcanizer. That is, a vulcanizer frame 1 is constructed of a base frame 1a, side frames 1b and a top platen 1c (including a center frame 1d in the case of a twin type). A fixed lower die 2 is mounted on the base frame 1a through a lower platen 18 and a dome 19 adapted to supply or incorporate a heat source such as steam. A center mechanism 15 is located at a central position of the fixed lower die 2 on the base frame 1a side. Slide guides 3 are mounted on the inner surfaces of the side frames 1b and the center frame 1d opposed thereto, and a slide 4 is vertically movably retained through liners 20 or the like to the slide guides 3. A movable upper die 5 is mounted through an upper platen 21 and a dome 22 like the above-mentioned ones to the lower surface of the slide 4. An adjusting screw shaft 6a is mounted upright at the center of the upper portion of the slide 4, which screw shaft is rotated forwardly and reversely by means of a rotating member 23. A hollow pressure member 7 like a hollow post is formed at its circumference with a vertically extending slit 7a, and is formed at its lower end with a tapped hole 7b threadedly engaged with the adjusting screw shaft 6a, thus constructing a height adjusting mechanism 6 for adjusting the height of the upper die. The top platen 1c is formed with a through-hole 24 for inserting the hollow pressure member 7 therethrough, and a bracket 8 is provided at a part of the top platen 1c exposed to the through-hole 24 at a position corresponding to the slit 7a. A hydraulic cylinder 9a of a vertically moving member 9 is mounted in concentrical relationship with the hollow pressure member 7. A piston rod 9b in the hydraulic cylinder 9a is adapted to be advanced into and retracted from the hollow pressure member 7, and one end of the piston rod 9b is connected to a connecting portion 10 provided in the hollow pressure member 7. Thus, the hollow pressure member 7 is vertically moved by the vertically moving member 9 to thereby vertically move the slide 4 through the height adjusting mechanism 6 and accordingly vertically move the movable upper die 5, thus opening and closing the movable upper die 5 relative to the fixed lower die 2. A hydraulic cylinder 11a of a pressure device 11 for clamping the die is fixed to a lower surface of the top platen 1c at the position of the through-hole 24 in such a manner as to surround the outer circumference of the hollow pressure member 7. A piston rod 11b in the hydraulic cylinder 11a is slidably fitted on the outer circumference of the hollow pressure member 7. In the tire vulcanizer of a vertically opening/closing type as mentioned above, a substantially box-like holder 26 is fixed to a lower end of the piston rod 11b serving as a movable pressure member (which is provided with a return spring 25) in the pressure device 11 which lower end is projectable out of the cylinder 11a as shown in FIGS. 3 to 5. The hollow pressure member 7 is designed to pass through the guide holder 26 at its central position. A pair of right and left locking members 17 are provided in the guide holder 26 in such a manner as to be advanced to and retracted from the hollow pressure member 7 perpendicularly thereto by means of driving cylinders 27. The driving cylinders 27 are fixed to the guide holder 26, and piston rods 27a in the cylinders 27 are connected to the locking members 17, thus linearly advancing and retracting both the locking members 17 to and from the outer circumference of the hollow pressure member 7. As shown in FIGS. 4 and 5, the hollow pressure member 7 is formed at its outer circumference with an annular recess serving as an engaging portion 16 to be engaged with the locking members 17 when the hollow pressure member 7 is lowered down to the die closing position. To make the locking members 17 securely lock the engaging portion 16, each of forward ends of the locking members 17 toward the engaging portion 16 is formed into a semi-circular recessed edge 17a contacting an inner circumferential surface of the engaging portion 16, and a lower surface of the recessed edge 17a is disposed on a pad 28 mounted on a lower surface 16b of the engaging portion 16. Further, each forward end of the locking members 17 excepting the semi-circular recessed edges 17a is formed into straight edges 17b radially outwardly extending from the recessed edges 17a. Accordingly, when both the locking members 17 are advanced to be engaged with the engaging portion 16 of the hollow pressure member 17, the straight edges 17b of the left locking member 17 are brought into facing engagement with the straight edges 17b of the right locking member 17.

In operation, when the hollow pressure member 7 and the slide 4 are lifted by the vertically moving member 9 to open the movable upper die 5 relative to the fixed lower die 2 and lift the movable upper die 5 as shown in FIGS. 2 and 3, the locking members 17 are preliminarily retracted to a position not interfering with the hollow pressure member 7 by means of the driving cylinders 27. Thus, the lift operation of the hollow pressure member 7 and the opening operation of the slide and the movable upper die 5 are smoothly carried out. When the hollow pressure member 7 is lifted to a position higher than the locking members 17, the locking members 17 are advanced inward of a lower end 7c of the hollow pressure member 7 by means of the driving cylinders 27 to thereby support the lower end 7c. Thus, even if there occurs misoperation or pressure escape in the vertically moving member 9, the lower end 7c of the hollow pressure member 7 is reliably supported by the locking members 17 to thereby reliably prevent the slide 4 and the movable upper die 5 from falling, thus improving the safety without mechanical damage and human accident and allowing an operator to carry out necessary work under the upper die lifted condition without danger. On the other hand, when the hollow pressure member 7 is lowered by the vertically moving member 9 to thereby lower the slide 4 and the movable upper die 5 and close the movable upper die 5 relative to the fixed lower die 2, the locking members 17 in the retracted position are advanced to engage the semi-circular recessed edges 17a formed at the forward ends of the locking members 17 with the engaging portion 16 formed on the outer circumference of the hollow pressure member 7. Then, the pressure supplied to the hydraulic cylinder 11a of the pressure device 11 is applied to the piston rod 11b as the movable pressure member to thereby lower the piston rod 11b. The downward force of the piston rod 11b is transmitted through the assembly of the locking members 17 and the engaging portion 16 to the hollow pressure member 7, thereby lowering the hollow pressure member 7. As a result, the force is applied through the slide 4 to the movable upper die 5 to reliably clamp the upper die 5 relative to the lower die 2. Thus, the locking members 17 function as both a die falling prevention means and a die clamping means without the provision of plural falling prevention mechanisms 13 as is required in the prior art. Furthermore, the mechanical means required for vulcanization are collectively arranged at the center of the press, thereby making the vulcanizer simple and compact as a whole.

The driving member of the locking members 17 in this preferred embodiment may be suitably selected from various types of cylinders such as a double acting hydraulic cylinder and a single acting hydraulic cylinder having a return spring. Further, although the above preferred embodiment employs two driving members for the two locking members 17, a single driving member and a synchronous locking mechanism such as a link may be employed to synchronously advance and retract both the locking members 17. Further, the shape and the structure of the engaging portion 16 between the hollow pressure member 7 and the locking members 17 are not limited to the above preferred embodiment, but any other shapes and structures satisfying both the functions of falling prevention and pressure load transmission may be applied.

Although the above preferred embodiment is intended to eliminate misoperation and problems in the vertically moving member 9 only, it is naturally preferable to consider any possible misoperation and problems in using the driving cylinders 27 as a drive source of both the locking members 17 from the viewpoint of increased safety. That is, if there occurs misoperation or pressure escape in the driving cylinders 27, locking by the locking members 17 is released, and if the vulcanization is being carried out, the slide 4 is lifted to cause the vulcanizing steam or hot water to be blown out, increasing the danger of a serious accident. However, such danger may be easily prevented by adding the following structure to the engaging portion 16 between the locking members 17 and the hollow pressure member 7 as shown in FIGS. 4 and 5. The straight edges 17b of the locking members 17 are formed with stopper pawls 29 projecting from the lower surface of the edges opposed to the pad 28, and the pad 28 is formed with recesses 30 to be engaged with the stopper pawls 29. As mentioned previously, both the locking members 17 are retained by the piston rod 11b vertically movable as a movable pressure member in the pressure device 11. Accordingly, in engaging the stopper pawls 29 of the locking members 17 with the recesses 30 of the pad 28, the stopper pawls 29 are first positioned above the recesses 30 by lifting the piston rod 11b, and then the locking members 17 are advanced by the driving cylinders 27 to be temporarily engaged with the engaging portion 16 of the hollow pressure member 7. Thereafter, the piston rod 11b is lowered to lower the locking members 17 with the guide holders 26 until the semi-circular recessed edges 17a are disposed on the pads 28 and the stopper pawls 29 are brought into engagement with the recesses 30 of the pads 28. With this arrangement, even if there occurs misoperation or a problem such as pressure escape in the driving cylinders 27, the locking members 17 are prevented from being retracted, and are maintained in their locking position. Accordingly, it is possible to prevent lifting of the slide 4 due to the release of the locking of the locking members 17 and thereby prevent steam or the like from being blown out. To further improve the safety, there may be provided a detecting means such as a limit switch for detecting the abnormal lift of the piston rod 11b during the vulcanization and a cutting means for cutting the supply of vulcanization pressure (steam or the like) into between the upper and lower dies 5 and 2. In this manner, safety may be remarkably improved. The above-mentioned structure of the locking members 17 having the stopper pawls 29 constitutes a modified embodiment of the present invention.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A device for preventing a slide from falling in a tire vulcanizer, including a vulcanizer frame, a fixed lower die fixedly located on said vulcanizer frame, a slide adapted to be lifted and lowered along said frame, a movable upper die retained to said slide and adapted to be vertically opened and closed relative to said lower die, a vertically moving member provided at a central position of said slide for opening and closing said upper die, a hollow pressure member provided at the central position of said slide for applying pressure to said upper die, said hollow pressure member being located diametrically outside said vertically moving member in such a manner as to be concentric with and separate from said vertically moving member, a pressure device mounted to said vulcanizer frame in such a manner as to surround said hollow pressure member, an upper die height adjusting mechanism for connecting said slide with said hollow pressure member; and a movable pressure member provided in said pressure device and a locking member disengageably mounted to said movable pressure member in such a manner as to surround said hollow pressure member, said locking member being disengaged from the hollow pressure member, when the hollow pressure member is lifted to raise the upper die and is engaged with the hollow pressure member at a position intermediate thereof when the hollow pressure member is in a die clamping position.

2. The slide falling prevention device as defined in claim 1, wherein said locking member is provided with a stopper pawl.

3. The slide falling prevention device as defined in claim 1 further comprising a driving cylinder for driving said locking member.

* * * * *